May 20, 1969     R. F. BURTON     3,444,626
SOIL CONDITIONING METHOD AND APPARATUS

Filed Sept. 7, 1967     Sheet 1 of 2

INVENTOR
ROBERT F. BURTON
BY Newton, Hopkins,
Jones & Ormsby
ATTORNEYS

United States Patent Office 3,444,626
Patented May 20, 1969

3,444,626
SOIL CONDITIONING METHOD
AND APPARATUS
Robert F. Burton, 3141 Wynn Drive,
Avondale Estates, Ga. 30002
Filed Sept. 7, 1967, Ser. No. 666,077
Int. Cl. F26b 5/04, 11/12, 13/30
U.S. Cl. 34—15                                                     10 Claims

ABSTRACT OF THE DISCLOSURE

What is disclosed herein is a soil conditioning method and a soil conditioning apparatus which embody an invention that provides conditioned soil for golf course and other special agricultural uses which is substantially free of fungi, plant seeds, insects, and other undesirable living matter. The soil conditioning method disclosed includes the steps of cascading soil from which substantially all air has been removed through a concentrated insecticide, herbicide, fungicide or similar soil conditioning chemical having the property of killing living matter in the soil or of otherwise conditioning the soil, removing substantially all of the soil conditioning chemical from the soil by applying a vacuum to the soil, and rinsing the residual soil conditioning chemical from the soil by cascading the soil through air. The apparatus disclosed includes a cascading means for cascading soil, an environment means for providing an environment of air or soil conditioning chemical to cascading soil, and vacuum means for applying a vacuum to soil. The cascading means disclosed is a sealable and rotatable drum having deflecting plates within and rotatable with the drum. The deflecting plates are shaped and positioned to cause cascading of soil dropping downwardly after being carried upwardly by rotation of the drum and to provide a blending device well suited to the invention and other uses.

BACKGROUND OF THE INVENTION

Field of the invention

The invention disclosed herein relates to soil conditioning and more particularly to a soil conditioning method and a soil conditioning apparatus that provide soil which is substantially free of living matter or is otherwise conditioned.

Description of the prior art

There is a continuing and growing requirement for conditioned soil which is substantially free of living matter such as fungi, insects, plants and plant seeds. This is because such conditioned soil is essential to establishing and maintaining golf course greens, to commercial gardening, and to other similar agricultural uses.

The manner in which conditioned soil is obtained for maintaining golf course greens is typical of the prior art. In the obtaining of conditioned soil for maintaining golf course greens, it has been customary in the prior art to spread a relatively thin layer of soil over a surface, to cover the layer of soil with a cover of plastic or similar material, to inject a heavier than air soil conditioning chemical under the cover, and to provide a period of time for the soil conditioning chemical to diffuse and be effective throughout the layer of soil and a subsequent period of time after removal of the cover for the soil conditioning chemical to diffuse from the layer of soil into the atmosphere.

The difficulty with obtaining conditioned soil for maintaining golf course greens by this prior art method is that it is necessary to provide approximately twenty-four hours for the soil conditioning chemical to diffuse through the layer of soil to insure that living matter in the soil is no longer living. In addition, it is necessary to provide approximately thirty-six hours for the soil conditioning chemical to diffuse from the soil into the atmosphere to insure substantial removal of the soil conditioning chemical from the soil prior to use of the soil. Moreover, in addition to these extended periods of time required by this prior art method for diffusing a soil conditioning chemical into and out of a layer of soil, difficulties and delays are frequently encountered because of holes in the cover and because the entire method and required apparatus are rather cumbersome.

Furthermore, the conditioning of soil by this prior art method is hazardous and is expensive because practical amounts of conditioned soil require the use of a relatively large number of people and of a relatively large amount of soil conditioning chemical. This prior art method is also restricted to the use of soil conditioning chemicals which are heavier than air so that they diffuse downwardly into the covered layer of soil.

SUMMARY OF THE INVENTION

The invention disclosed herein solves these and other difficulties encountered in the prior art with respect to the conditioning of soil. This is because the invention provides a soil conditioning method and apparatus by which conditioned soil is easily and conveniently obtained in several hours for use in maintaining golf course greens and for other agricultural uses. The invention requires a small amount of soil conditioning chemical relative to that required in the prior art and the soil conditioning chemical need not be heavier than air. Moreover, the invention permits hazardous soil conditioning chemicals to be safely used and requires relatively few people. As a result of the few people required and the small amount of soil conditioning chemical required, the invention provides conditioned soil at a fraction of the cost at which conditioned soil is provided in the prior art.

The invention provides these improvements in soil conditioning by cascading or otherwise dispersing a quantity of soil through a concentrated soil conditioning chemical by applying a vacuum to the quantity of soil to remove soil conditioning chemical from the soil, and by cascading the quantity of soil through air to rinse soil conditioning chemical from the soil. The method disclosed herein includes the steps of placing a quantity of soil under a vacuum to remove all but a small residual amount of air from the quantity of soil, cascading the quantity of soil through a soil conditioning chemical diluted only by the small amount of residual air, and alternately applying a vacuum to the quantity of soil and cascading the quantity of soil through air until substantially all of the soil conditioning chemical is removed from the quantity of soil.

The apparatus disclosed herein includes a blending device which has a rotatable drum and a plurality of deflecting plates and which serves as a cascading means for cascading soil within an enclosure, a vacuum means for applying a vacuum to soil within the enclosure, and an environment means for selectively providing an environment of air or soil conditioning chemical to soil within the enclosure. As embodied in the method disclosed herein or in the apparatus disclosed herein, the invention provides for the conditioning of soil in a rapid, efficient, safe and relatively inexpensive manner which has not been achieved in the prior art.

BRIEF DESCRIPTION OF THE DRAWING

These and other features and advantages of the invention will be more clearly understood from the following detailed description and the accompanying drawing in which like characters of reference designate corresponding parts throughout and in which.

DESCRIPTION OF EMBODIMENTS

These figures and the following detailed description disclose a method and an apparatus which embody the invention disclosed herein. However, it should be understood that the invention is not limited to the embodiments disclosed herein since it may be embodied in other equivalent forms.

Figure 1:
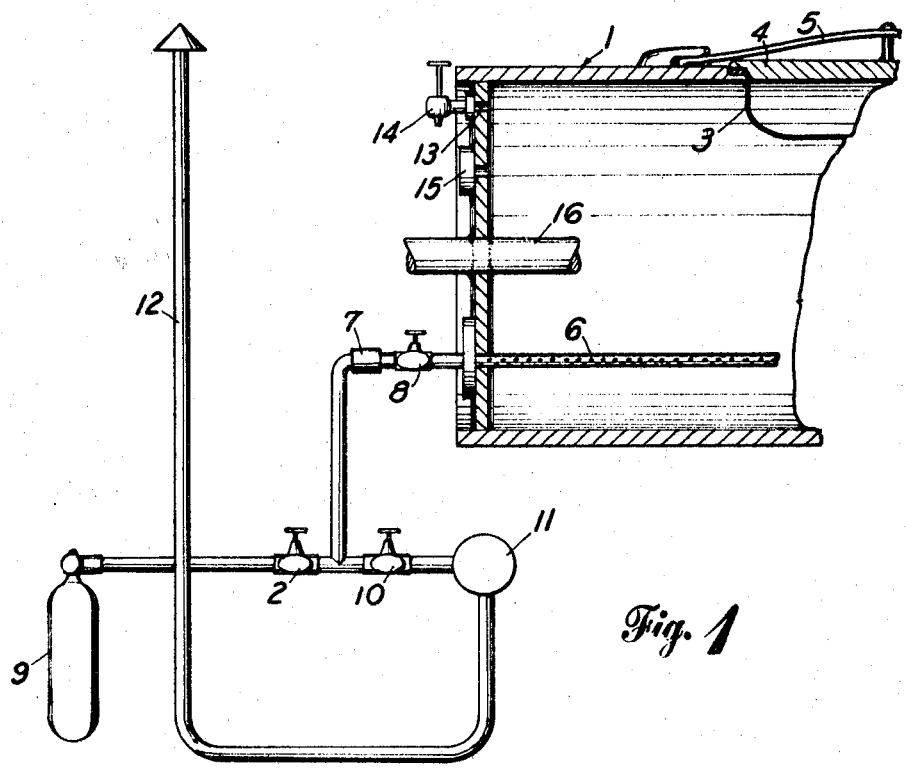
FIG. 1 is a schematic presentation of apparatus embodying the invention disclosed herein and for practicing the method disclosed herein.

The invention disclosed herein is mostly easily understood in terms of the apparatus embodying the invention. From FIG. 1 it will be seen that the apparatus includes a drum 1 having an opening 3 which is closed by a self sealing closure plate 4 and a latching device 5. Extending through one end of the drum and along the length of the drum is a filter pipe 6 having a valve 8 at its extending end to which a quick disconnect coupling 7 is easily and conveniently connected. The filter pipe 6 is conventional and provides for the flow of a gas into and out of the drum 1.

The coupling 7 is connected through a valve 2 to a flask or container 9 of a soil conditioning chemical such as methyl bromide and through a valve 10 to a vacuum pump 11 having its discharge through a pipe 12. An air tube 13 extends into the drum 1 through a valve 14 and a pressure gauge 15 is mounted in conventional manner on the drum 1 to measure gas pressure within the drum 1.

Figure 2:
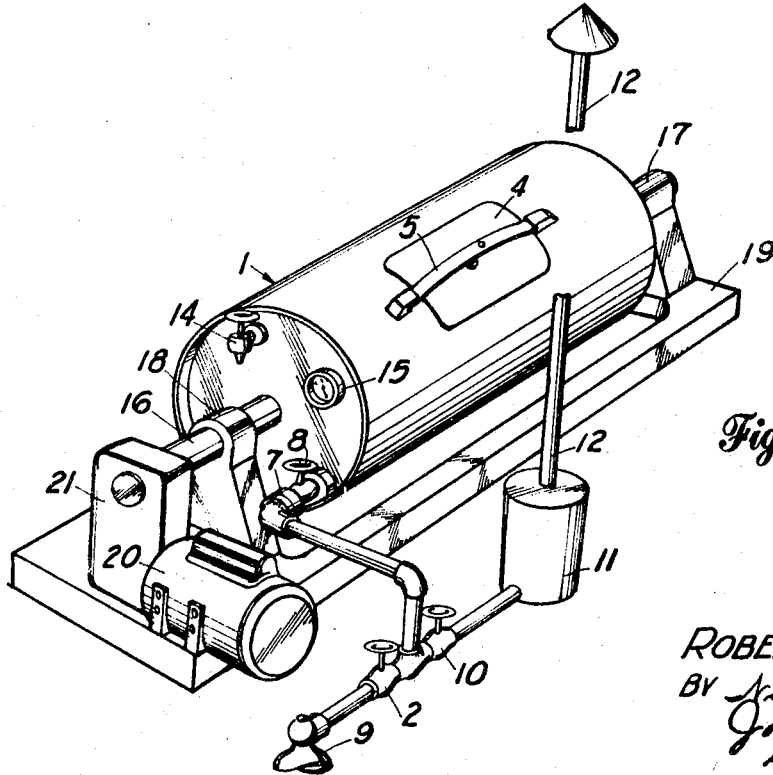
FIG. 2 is a perspective view of apparatus embodying the invention disclosed herein.

The drum 1 is fixedly mounted on a shaft 16 having its centerline coinciding with the centerline of the drum 1 and as shown in FIG. 2, the extending ends of the shaft 16 are positioned within bearing blocks 17 and 18 mounted on a base 19. As also shown in FIG. 2, a motor 20 is operatively connected to the shaft 16 through a reduction gear 21 so that upon operation of the motor 20, the drum 1 is rotated.

Figure 3:
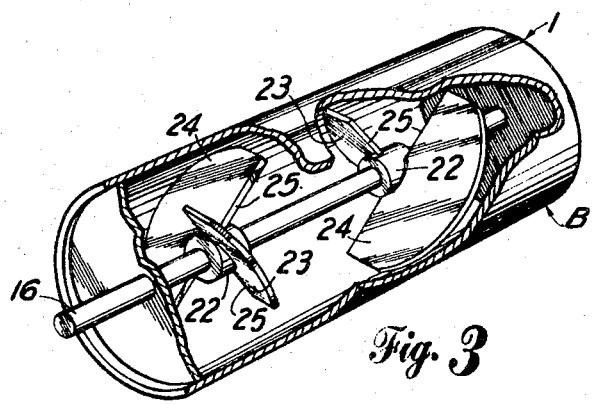
FIG. 3 is a perspective view partially cut away of the blending device in the apparatus shown in FIG. 2.

As is best seen in FIG. 3, a plurality of collars 22 are fixedly positioned on the shaft 16 within the drum 1 and each collar 22 has a plurality of deflecting plates 23 and 24 mounted on it. Each of the deflecting plates 23 and 24 is an elongated substantially flat plate which is mounted at the mid-point of an elongated side 25 to a collar 22 so that the long axis of its substantially flat surface parallel to the side 25 is inclined to the centerline of the shaft 16 and so that the short axis of the surface perpendicular to the long axis is substantially perpendicular to the centerline of the shaft 16. As is also best shown by FIG. 4, the deflecting plate 23 and the deflecting plate 24 mounted on each collar 22 are inclined at approximately forty-five degrees in opposite directions to the center line of the shaft 16.

The drum 1, the shaft 16, and the deflecting plates 23 and 24 rotate as a unit upon rotation of the shaft 16 by the motor 20 through the reduction gear 21 and provide a blending device B. However, in the apparatus disclosed herein, the blending device B serves as a cascading means for cascading soil through an enclosure. This will be understood from FIGS. 4 and 5.

Figure 4:
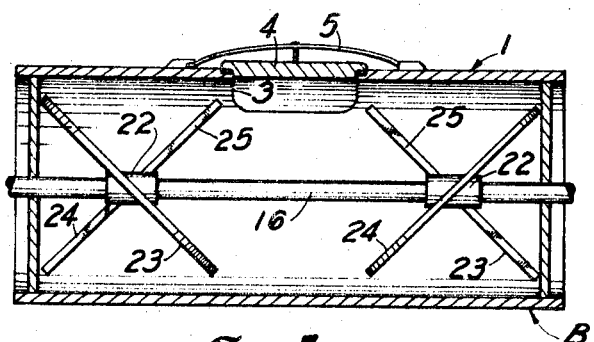
FIG. 4 is a cross-sectional view of the blending device shown in FIG. 3.

From FIG. 4, it will be seen that when the drum 1 is in that position in which the elongated sides 25 of the deflecting plates 23 and 24 are in substantially parallel vertical planes of reference, soil falling downwardly within the drum 1 cascades to the right as seen in FIG. 4 along the surfaces of the deflecting plates 23 and to the left as shown in FIG. 4 along the surfaces of the deflecting plates 24. It will be understood that soil is carried upwardly by rotation of the drum 1 and that when the drum 1 is rotated one-hundred and eighty degrees from the position shown in FIG. 4, soil cascades downwardly along the surfaces of the deflecting plates 23 and 24 in directions opposite to those shown in FIG. 4.

Figure 5:
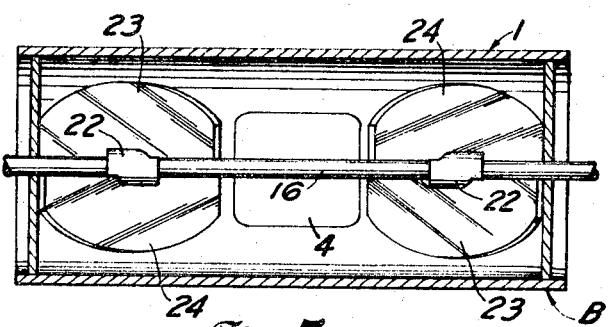
FIG. 5 is a cross-sectional view of the blending device shown in FIG. 3 but with the deflecting plates in different positions than those shown in FIG. 4.

FIG. 5 shows the drum 1 rotated ninety degrees from that position shown in FIG. 4 and it will be seen from FIG. 5 that with the drum 1 in this position, soil dropping downwardly within the drum 1 also cascades along the surfaces of the deflecting plates 23 and 24. However, it will be noted from FIG. 5 that with the deflecting plates in this intermediate position between that position shown in FIG. 4 and that position which is one-hundred and eighty degrees from that position shown in FIG. 4, the soil is not cascaded to the right or left along the length of the drum 1. Between that position of the drum 1 shown in FIG. 4 and that shown in FIG. 5, soil is cascaded to the right or left along the length of the drum 1 by varying amounts.

It has been found that with the rotating drum 1 and the inclined deflecting plates 23 and 24 which continuously change position relative to soil falling downwardly within the drum 1, soil or other solid material within the drum 1 is continuously moved by a cascading action back and forth along the length of the drum 1. The result is not only a cascading action but also a thorough and complete blending of soil or of other material within the drum 1.

In using the apparatus described in conditioning soil for use in maintaining golf course greens and other uses, a quantity of soil is placed within the stationary drum 1 through the opening 3 and the drum 1 is closed by the closure plate 4. The coupling 7 is connected to the valve 8, the valves 8 and 10 opened, and the pump 11 operated until the pressure gauge 15 indicates that air has been removed from the drum 1 and the quantity of soil to such an extent that there is substantial vacuum within the drum 1. It has been found that using a pump 11 of one horsepower and with approximately a cubic yard of soil filling the drum 1 to approximately sixty to seventy percent of its capacity, a vacuum of approximately twenty-five inches of mercury is achieved in approximately twenty minutes.

Once substantially all of the air has been removed from the quantity of soil within the drum 1 by the operation of the pump 11, the valve 10 is closed and the valve 2 is opened to deliver a gaseous soil conditioning chemical in the container 9 into the drum 1. When the pressure gauge 15 indicates that the pressure of the soil conditioning chemical and residual air within the drum 1 are substantially equal to atmospheric pressure, the valves 2 and 8 are closed and the coupling 7 is disconnected from the valve 8. It will be understood that the pressure within the drum 1 is sufficiently less than atmospheric pressure to insure that the self-sealing closure plate 4 is operative and that the sealed drum 1 prevents injury from the soil conditioning chemical.

With the quantity of soil in an environment of substantially pure concentrated soil conditioning chemical within the drum 1, the drum 1 is rotated by operation of the motor 20. As the drum 1 rotates, the quantity of soil within the drum 1 is continuously cascaded through the soil conditioning chemical by the cascading action of the drum 1 and deflecting plates 23 and 24. It has been found that with the drum 1 rotating at approximately eleven r.p.m. and approximately sixty to seventy percent filled with approximately one cubic yard of soil, approximately thirty minutes of cascading the soil through an environment of commercial available methyl bromide and the residual air remaining in the drum after a vacuum of approximately twenty-five inches of mercury will substantially destroy all living matter in the soil.

After cascading a quantity of soil within the drum 1 through a concentrated soil conditioning chemical for the period of time required to destroy living matter or to otherwise condition the soil, rotation of the drum 1 is stopped, the coupling 7 is connected to the valve 8, the valves 8 and 10 are opened, and the pump 11 is operated until the pressure gauge 15 indicates that the soil conditioning chemical has been removed from the drum 1 and the quantity of soil to such an extent that there is a substantial vacuum within the drum 1.

It should be understood that the pipe 12 is of substantial length to insure that the soil conditioning chemical is discharged at a location which is sufficiently remote from the drum 1 to avoid hazard from the soil conditioning chemical in the vicinity of the drum 1. When the pressure gauge 15 indicates a substantial vacuum within the drum 1, the pump 11 is stopped, the valves 8 and 10 are closed, the coupling 7 is disconnected from the valve 8, and the valve 14 is opened to supply air to the drum 1 until the pressure gauge 15 indicates that atmospheric pressure has been achieved within the drum 1.

After sufficient air has entered the drum 1 through the valve 14 for atmospheric pressure to be achieved within the drum 1, the valve 14 is closed and the drum 1 is rotated by operation of the motor 20 to rinse soil conditioning chemical from the quantity of soil by cascading the quantity of soil through air. Following a period of rinsing, rotation of the drum 1 is stopped, the coupling 7 is connected to the valve 8, the valves 8 and 10 are opened, and the pump 11 is operated until the pressure gauge 15 indicates that a substantial vacuum has been achieved within the drum 1.

When the pressure gauge 15 indicates that a substantial vacuum has been achieved within the drum 1, the pump 11 is stopped, the valves 8 and 10 are closed, the coupling 7 is disconnected from the valve 8, and the valve 14 is opened to supply air to the drum 1 until the pressure gauge 15 indicates that atmospheric pressure has been achieved within the drum 1. With achieving of atmospheric pressure within the drum 1, the valve 14 is closed and the drum 1 is again rotated by operation of the motor 20 to once again rinse soil condiioning chemical from the quantity of soil by cascading the quantity of soil through air. Following this second period of rinsing, the rotation of the drum 1 is discontinued, the coupling 7 is connected to the valve 8, the valves 8 and 10 are opened, and the pump 11 is operated until the pressure gauge 15 indicates a substantial vacuum has been achieved within the drum 1.

Two rinsing periods each of approximately three minutes duration and each proceeded and followed by a vacuum of approximately twenty-five inches of mercury have been sufficient to remove substantially all methyl bromide from approximately one cubic yard of soil filling approximately sixty to seventy percent of the drum 1. However, the number of periods of rinsing may be varied and following the last period of rinsing and the removal of the rinsing mixture by applying a vacuum, the coupling 7 is disconnected from the valve 8, the valves 8 and 10 are closed, the valve 14 is opened to achieve atmospheric pressure within the drum 1, and the drum 1 is rotated into that position which places the opening 3 lowermost to permit emptying of the quantity of soil through the opening 3 into a suitable container or chute (not shown).

It will be understood that the length of time during which soil is cascaded through a soil conditioning chemical, the length and number of periods of rinsing, the amount of vacuum applied to the soil, and the amount of time required to achieve a vacuum are dependent upon factors such as the condition and quantity of the soil being conditioned, the soil conditioning chemical used, the size of the drum 1, and the size of the pump 11. Regardless of such factors, conditioned soil is achieved in a few hours.

It will also now be understood that the method of conditioning soil disclosed herein involves cascading soil through a soil conditioning chemical, applying a vacuum to the soil to remove soil conditioning chemical from the soil, and cascading the soil through air to rinse the soil conditioning chemical from the soil. The embodiment of this method disclosed herein includes the steps of applying a vacuum to a quantity of soil to remove all but a small amount of residual air from the quantity of soil, cascading or otherwise dispersing the quantity of soil through a soil conditioning chemical diluted only by the residual air, applying a vacuum to the quantity of soil to remove substantially all of the soil conditioning chemical, and alternating cascading the quantity of soil through air to rinse the soil conditioning chemical from the quantity of soil and applying a vacuum to the quantity of soil until substantially all of the soil conditioning chemical is removed from the quantity of soil.

Further, it will now be understood that the apparatus disclosed herein includes a cascading means such as the drum 1 for cascading soil through an enclosure, a vacuum means such as the pump 11 for applying a vacuum to a quantity of soil within the enclosure, and an environment means such as the container 9 and the valve 14 for selectively providing an environment of air or soil conditioning chemical in the enclosure. Moreover, it will be understood that the drum 1 with the deflecting plates 23 and 24 serves to provide a blending device B for blending any substantially solid material such as a quantity of soil.

It will be further understood by those skilled in the art that many variations may be made in the embodiments chosen for the purpose of illustrating the present invention without departing from the scope thereof as defined by the appended claims.

I claim:

1. In a method of conditioning soil, the steps of cascading soil through a soil conditioning chemical, applying a vacuum to said soil to remove soil conditioning chemical from said soil, and cascading said soil through air.

2. The method of claim 1 including the step of applying a vacuum to said soil which is sufficient to remove substantially all air from said soil prior to cascading said soil through a soil conditioning chemical.

3. The method of claim 2 including the step of applying a vacuum to said soil subsequent to cascading said soil through air.

4. The method of claim 3 in which said soil conditioning chemical is methyl bromide.

5. The method of claim 4 in which said soil is of a composition selected for use of said soil as top dressing in maintaining golf course greens.

6. The method of claim 1 including the step of removing substantially all air from said soil to leave only residual air prior to cascading said soil through a soil conditioning chemical and in which said soil conditioning chemcal is a substantially pure soil conditioning chemical diluted by said residual air.

7. In a method of conditioning soil, the steps of dispersing soil through a soil conditioning chemical and subsequently dispersing said soil through air.

8. In an apparatus for conditioning soil, a cascading means for cascading soil through an enclosure, a vacuum means for applying a vacuum to soil within said enclosure, and an environment means for selectively providing an environment of air alternately with an environment of soil conditioning chemical to soil within said enclosure.

9. The apparatus of claim 8 in which said cascading means is a rotating drum having deflecting means for laterally deflecting soil falling downwardly within said drum.

10. The apparatus of claim 9 in which said drum has a centerline and in which said deflecting means is a plurality of deflecting plates, each having a flat surface with a short axis substantially perpendicular to said centerline and a long axis perpendicular to said short axis and inclined to said centerline.

References Cited

UNITED STATES PATENTS

| | | | |
|---|---|---|---|
| 2,563,926 | 8/1951 | Elliott et al. | 47—1.42 |
| 3,255,076 | 6/1966 | Weil et al. | 167—13 |

KENNETH W. SPRAGUE, *Primary Examiner.*

U.S. Cl. X.R.

34—92, 135